Figure 5:
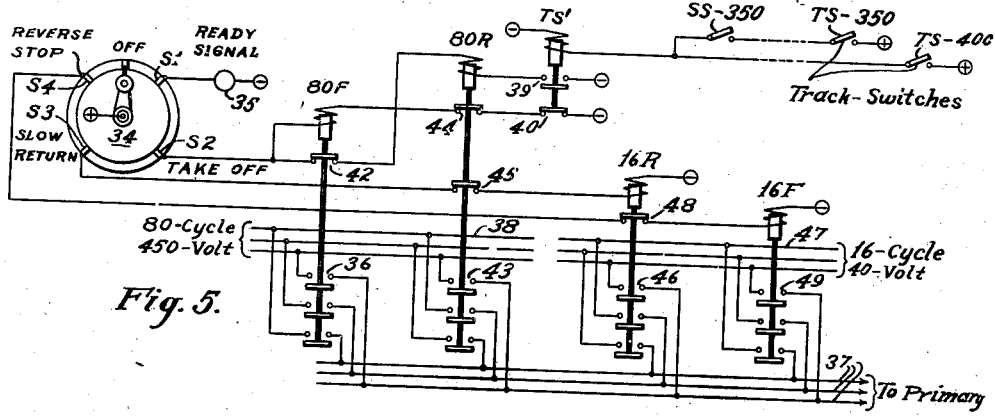

July 30, 1946.　　　　F. B. POWERS　　　　2,404,984
ELECTRIC TOWING-CAR CATAPULT FOR AIRCRAFT
Filed Jan. 28, 1943　　　2 Sheets-Sheet 1
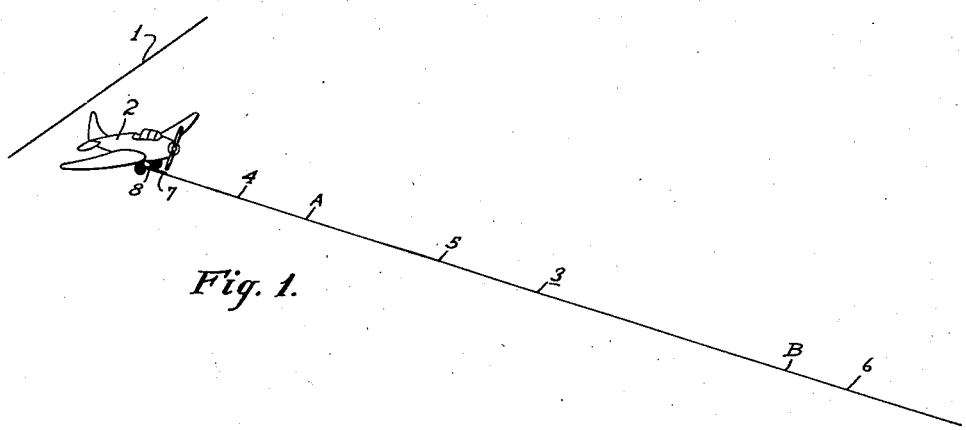
Fig. 1.
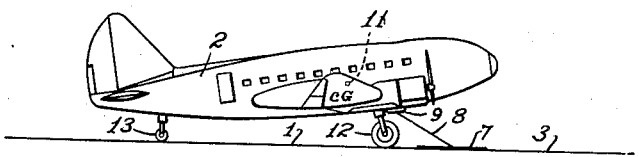
Fig. 2.
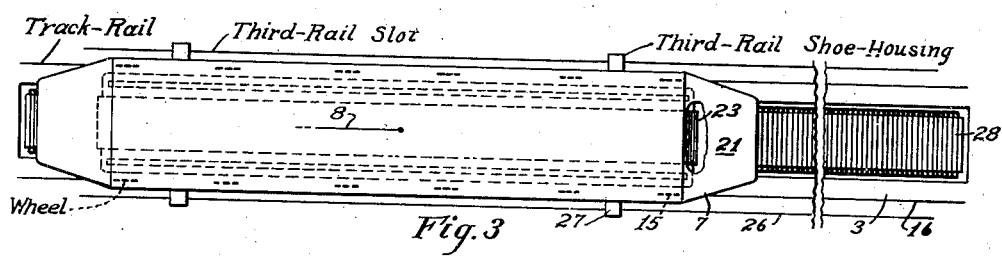
Fig. 3.
Fig. 4.
WITNESSES:
Edward M. Michaels
INVENTOR
Frank B. Powers.
BY O. B. Buchanan
ATTORNEY INVENTOR
Frank B. Powers.

Patented July 30, 1946

2,404,984

UNITED STATES PATENT OFFICE 2,404,984

ELECTRIC TOWING-CAR CATAPULT FOR AIRCRAFT

Frank B. Powers, Pittsburgh 16, Pa., assignor to Westinghouse Electric Corporation, East Pittsburgh, Pa., a corporation of Pennsylvania Application January 28, 1943, Serial No. 473,843

8 Claims. (Cl. 172—126)

My invention relates to catapults for aircraft, particularly for airplanes and gliders, and it has particular relation to a type of catapult utilizing a self-moving towing-car, which is driven on the principle of a flattened-out or developed induction-motor, so that no spur-gears are needed in order to develop much more traction than could be developed by motor-driven wheels on a smooth track or roadway. An important feature of my invention is that the towing-car is low and flat, something like 5 inches tall, or less, so that neither the spread-apart landing-wheels nor the bottom structure of the plane will strike the towing-car when the plane overruns the car at the instant of take-off, and so that, in the case of a plane having a tricycle-type landing-gear, the small single wheel in front can ride on top of the towing-car during the accelerating period when the plane is being towed.

Catapult equipment is needed, not only for aircraft-launching from aircraft-carriers or ships, but also for land-based aircraft. This problem is becoming particularly acute as the planes are getting larger and larger, and as the take-off-speeds are getting higher and higher. After a plane is once in the air, it takes a relatively small amount of force to keep it in the air, and to maintain its velocity, and a prime-mover-equipped plane can readily serve as a locomotive-plane for pulling from one to six or eight freight-carrying gliders. The problem is, however, to get the aircraft into the air, and for this purpose, it is necessary to apply large accelerating forces, many times larger than the flight-sustaining forces which are required once the craft is in the air. Not only does this take-off-problem seriously affect the prime-mover requisites of the plane, but it is also imposing a serious problem in connection with landing-fields, which now have to be considerably more than a mile in length, in order to launch some of the heavier planes. This landing-field problem is so serious that attention has been given, more and more, to the use of flying boats, for heavy load-carrying duty, where the water can be utilized for long take-offs, without requiring the purchase and development of extensively large airfields.

My invention is particularly adapted to the problem of launching an airplane or glider which is either of unusually heavy size or weight, or which requires an unusually high launching-speed. Heretofore, successful catapults for aircraft have been strictly limited in both of these categories, that is, both as to the launching-speed which could be obtained, and as to the size of plane which could be successfully launched. For instance, catapults utilizing pulleys and cables, driven by racks operated from a hydraulic piston or explosion-chamber, have been strictly limited as to the amount of tension which could be put on any suitable flexible cable, by the mass of the cables which had to be accelerated and stopped, and by the practical inability of stopping the heavy towing-hook, by any practical system of shock-absorbers.

My invention is also particularly adaptable for catapults having no limitation as to the length of the runway, that is, catapults which have no moving parts extending the whole length of the runway. It is, of course, apparent that, if the runway is hundreds of feet long, the mass of the moving parts of the catapult would become quite excessive, if the catapult itself were pulled or pushed, along the entire length of the runway, by something that had to be longer than the runway. An object of my invention is to provide a successful form of catapult which is susceptible to long, as well as short, runways.

On the other hand, self-propelled towing-cars, as previously designed, have been limited, as to the accelerating force which it has been possible for them to develop, either by the amount of traction which it is possible to develop between the motor-driven wheels and smooth track-rails or roadway, or by the vertical component of the towing-force lifting the towing-car off of the ground, or by the fact that the towing-car has stood so high, that it had to be buried in a deep roadway underground, with a slotted cover over it, through which the towing-equipment could project above the level of the runway.

An object of my invention is to provide a towing-car for aircraft-catapults, which is electrically driven by a developed induction motor, having flat primary and secondary members, with an airgap in between, one of said members being carried by the towing-car, and the other of said members being extended out over the entire length of the runway, including a suitable distance for electrically stopping the towing-car after the plane or glider has been launched. A significant feature of my invention is that my towing car is made long enough to be low, with tapered ends which will permit a wheel of an aircraft landing-carriage to run onto, or over the towing-car without damage.

My towing-car has enough magnetic attraction between its primary and secondary members, to successfully hold the towing-car to the ground, against the vertical component of the pull of the towing-rope. My towing-car develops its accelerating-force through the magnetic attraction of a moving polyphase-excited magnetic field traveling linearly along the primary member, and reacting, through the airgap, on the secondary member, so that no driving-wheels are utilized at all. And finally, what is essential in any heavy, or fast-moving, towing-car for aircraft-catapults, my towing-car has means for electrically stopping itself within a relatively short distance after the launching of the aircraft, or means for at least electrically reducing the speed of the towing-car to a velocity of 50 miles per hour, or less, at which it is possible to complete the retardation of the towing-car by means of mechanical or hydraulic shock-absorbers or buffers of various types.

My invention also relates to practical details of the developed induction motor which operates the towing-car. The part of the developed or flattened-out induction motor which is carried by the car can be either the primary or the secondary member of the motor, and in either case, there are important practical difficulties, and my invention relates to specific means and combinations for overcoming some of these difficulties.

From the standpoint of initial cost, I prefer to place the primary member on the towing-car, which entails the use of third-rails for energizing the towing-car. This also entails the problem of providing a satisfactory secondary member, which is extended out along the entire length of the runway, including the stopping-distance, and which is a suitable induction-motor secondary at all points. Thus, the car starts and stops as an induction-motor having a very high slip, which entails the use of a high-resistance secondary-member for best results under these conditions. On the other hand, during the intermediate portions of the run of the towing-car, before the aircraft is actually launched, the induction-motor should operate at a low slip, which means a low-resistance secondary winding.

Of course, it would be conceivably possible to utilize a variable-pole-number primary winding on the towing-car, with means for changing the pole-number, or the pole-pitch, during the accelerating period, but this would necessitate a much larger towing-car to accommodate the less efficient windings and the necessary switching-equipment, to say nothing of its cost, all of which relegates such expedients to the realm of the impractical. On the other hand, it would be possible to vary the frequency of the polyphase energy which is fed into the third-rails which energize the car-borne primary during the accelerating period, and this is definitely a possibility, even though it may entail additional inertias to be accelerated, but even here the induction motor operates best if it has a high-resistance secondary winding at first, followed by a low-resistance secondary-winding after the car has built up appreciable speed, and preferably also followed by another low-resistance section during which the car is to be decelerated or even reversed, in direction, for the purpose of bringing it back to the starting-point, ready for another launching.

It would also be conceivably possible to provide a wound-secondary type of secondary-member, having external resistances which could be cut in or out by means of suitable switches, but here again, the only really practical solution seems to be in the form of a squirrel-cage type of secondary-winding which is a high-resistance winding for a certain length along the initial portion of the runway, and which is a low-resistance winding over the principal intermediate portion of the runway, and which is again of high-resistance at the terminal portion of the runway. The high-resistance terminal portion not only increases the amount of decelerating torque which can be developed, but it also enables the runway to be symmetrical, so that the towing-car can be operated for launching an aircraft in either direction, according to the wind-direction at the moment.

If the primary member of the developed induction-motor is placed on the landing-field, with the secondary member being carried by the towing-car, the towing-car can obviously be made lighter, by being required to carry only the secondary windings rather than the primary windings. The rate of heating of the car-borne member would not be as great, so that its ventilating problem would be easier, or its output, for a given size of towing-car, could be greater. Furthermore, the secondary winding of an induction motor, particularly if of the squirrel-cage type, can readily be made to successfully withstand higher temperatures than the primary winding, so that the car-borne secondary member could be worked harder than if it were a primary member.

On the other hand, a long, developed, primary member, carried by the track-way, and having a length which is many times the length of the towing-car, simply would not work, if the whole primary winding were energized at once, because the portions of the primary winding which were not covered by the towing-car, and which, therefore, have no return-path for the primary-winding flux, would simply short-circuit the relatively extremely short portion of the primary-winding which lies under the towing-car, so that it would be practically impossible to get any material amount of electrical energy into that relatively short portion of the primary winding which constitutes the means for developing a propelling-force for the car. To successfully utilize the type of developed induction motor having the primary member along the runway, it is quite necessary, therefore, to limit the energized portion of the primary winding to the portion underlying the car at any moment, or to vary slightly more than such a portion, which means a very large number of heavy-duty primary-winding switches, for handling something like 1,000 kilowatts of electrical energy, more or less.

Moreover, with a stationary-primary type of developed induction motor, if the towing-car is to be small and low and flat, it will not be at all feasible to utilize a wound type of secondary winding, with resistance-changing means, but it will be necessary to utilize a squirrel-cage winding, and to make that squirrel-cage winding of fairly low resistance, so that it will be suitable for the high-speed, low-slip operating periods. This means that the rate of movement, or advancing, of the primary-winding field must be reduced, at starting, which may be accomplished either by the use of a reduced frequency for the power-source at starting, or by the use of a primary winding which is laid out with a shorter pole-pitch at starting, than at an intermediate point, where the speed of the car is to be higher.

It is a feature of my invention, therefore, that I utilize both the sectionalizing switches for energizing only an extremely limited portion of the stationary primary winding at a time, and that I also utilize a primary winding which is laid out with a short pole-pitch at first, and with a longer pole-pitch later on, when the towing-car has achieved a considerable speed.

Figure 6:
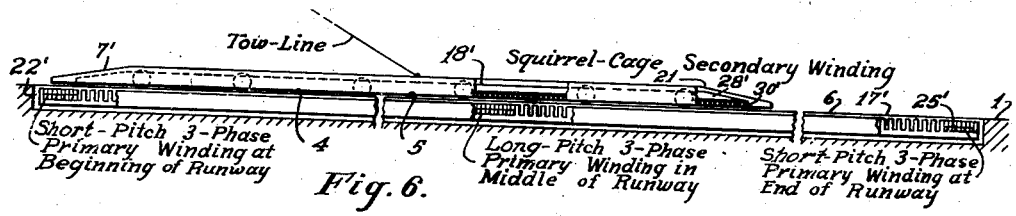
Figure 7:
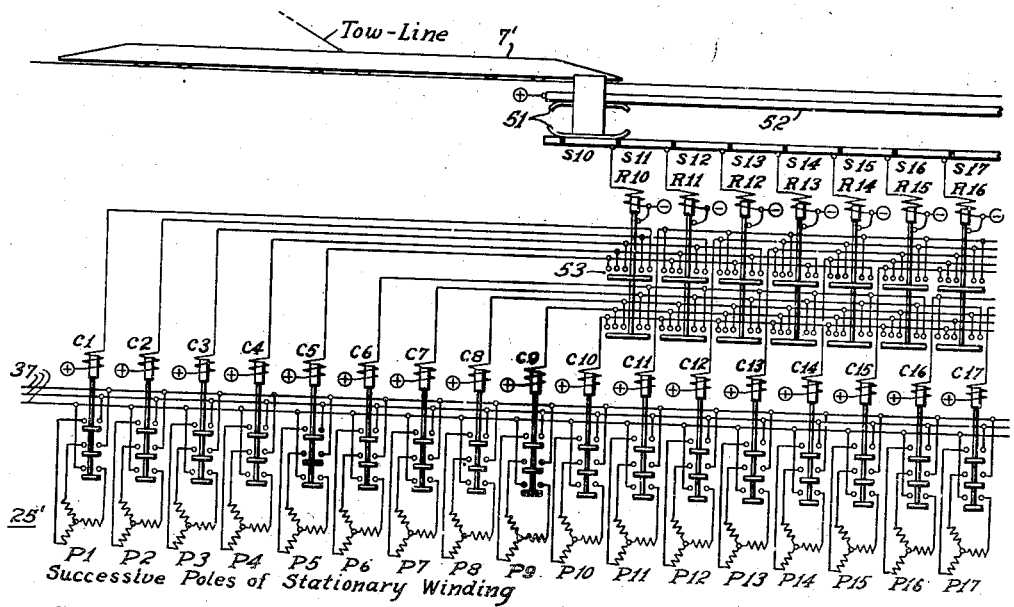

With the foregoing and other objects in view, my invention consists in the apparatus, parts, combinations, systems and methods hereinafter described and claimed, and illustrated in the accompanying drawings, wherein:

Figure 1 is a prospective view of a flying-field to which my invention is applied, Fig. 2 is a diagrammatic side-elevational view illustrating a method of connection between my towing-car and an airplane, Fig. 3 is a plan-view of my towing-car on a runway, Fig. 4 is a longitudinal sectional view along the runway, with my towing-car shown in elevation, parts being broken away to illustrate its construction, the car carrying a flattened-out or developed primary winding for a developed induction motor, while the runway carries a developed squirrel-cage secondary member running the entire length of the runway, Fig. 5 is a diagrammatic view of circuits and apparatus illustrative of the electrical control-equipment for my towing-car, Fig. 6 is a view similar to Fig. 4, illustrating an alternative form of embodiment of my invention, in which the primary winding is on the runway and the squirrel-cage winding is on the car, and Fig. 7 is a diagrammatic view of circuits and apparatus illustrating the sectionalized energization of the stationary primary winding of Fig. 6.

In Fig. 1, I illustrate an airfield 1, by which term I contemplate any solid airfield, either on land, or on shipboard or raft. I have shown an airplane 2 ready for take-off along a runway 3 which is flush with the surface of the airfield 1, and in fact forms a part of the airfield. The runway 3 preferably extends in a straight line along the airfield, for any necessary distance. The particular runway which I have chosen for illustration is a 500-foot runway, of which the first hundred feet, or from the starting-point to the point A, may be regarded as the first part 4, of the runway, this being followed by a 300-foot intermediate portion 5, extending from the point A to the 400-foot point B, which is in turn followed by the end or terminal portion 6. It will be understood that the lengths mentioned are merely illustrative and are by no means intended in a limiting sense.

The aircraft 2, in accordance with my invention, is towed along the runway 3 by means of a towing-car 7, which is attached to the aircraft 2 by means of a detachable tow-line 8, or other separable accelerating-connection. As shown in Fig. 2, the towing-rope 8 should extend from the towing-car to a hook 9 at a point which is in front of the center of gravity 11 of the plane, and such that the line of action of the towing-rope 8 will extend in a line running underneath the center of gravity 11.

Attachment of the towing-line at a point 9 in advance of the center of gravity 11 is necessary in order that the plane will steer itself during the accelerating period of the take-off run, thus relieving the pilot of the very exacting task of accurately steering the plane during this period when so much is happening in a very few seconds. Since most of the weight of the plane is on the large wheels 12 which, in the illustrated example, are the front wheels of a three-point landing-gear, the single tail-wheel 13 permits the tail of the craft to align itself so that the center of gravity 11 of the plane is in the same vertical plane as the towing-line 18.

It is necessary for the line of action of the towing-line 8 to pass beneath the center of gravity 11 in order that the strong accelerating force or pull of the tow-line may exert a moment pulling down on the rear end of the plane, so as to prevent the tail of the plane from rising off of the ground prior to the exact instant of take-off, or at least so that the pulling-force is in such a line as to tend to prevent any considerable amount of tail-elevation during the accelerating period prior to actually taking off.

As shown in Figs. 3 and 4, the towing-car 7 is very low, and flat, being, in the illustrated example, only about 5 inches tall, in a car having a momentary rating of 3,000 horsepower, although, by changing the width and the length, or by utilizing two or more towing-cars, the towing-capacity can be increased within any practical limits. The car is provided with wheels 15, which may run on rails 16, or other smooth flat surface substantially flush with the surface of the airfield.

The car 7 is electrically propelled by means of a developed or flattened-out induction-motor consisting of a primary member 17 and a secondary member 18, with an airgap 19 in between, the airgap being somewhat exaggerated, in Fig. 4, in order to be able to show it at all, at the scale to which this figure is drawn. In the particular form of embodiment of my invention which is shown in Figs. 3 and 4, which is in most respects the preferred form of embodiment of my invention, although it is not the only form of embodiment, the primary member 17 is carried by the car 7, and is substantially coextensive in length with the length of the car, the car being longer only by reason of the provision of an inclined ramp 21 at each end. This means that the secondary member 18 of the developed induction motor is the stationary part, which is carried by the runway 3, being preferably carried in a shallow ditch 22 which is cut in the runway, so that the top surface of the secondary member 18 may be substantially or approximately flush with the surface of the airfield 1, so that aircraft can land on the field crosswise with respect to the runway 3.

The car-borne primary member 17 comprises a laminated magnetizable core 23 having slots 24 therein, in which are placed a polyphase primary winding 25, preferably a 3-phase winding, disposed on the primary core 23 close to the airgap 19. Three-phase power is fed into the primary winding 25 through the track-rails 16 and third-rails 26, which may be of any suitable type, such as the slot-type familiar in old-fashioned street-cars. In Fig. 3, I have shown third-rail shoe-housings 27 for the current-collecting equipment.

The stationary secondary member 18 comprises a laminated magnetizable core 28 having a squirrel-cage winding 30 thereon close to the airgap. As previously explained, I preferably utilize, in accordance with my invention, a plurality of different types of squirrel-cage winding 30 for the different portions 4, 5 and 6 of the runway 3. As indicated by legends, in Fig. 4, the squirrel-cage winding 30 is a high-resistance winding at the beginning and end-portions 4 and 6 of the runway, which may be accomplished by utilizing a high-resistance end-connection 31 at the ends of the squirrel-cage bars. In the central portion 5 of the runway, however, where the car 7 is expected to be motoring with a considerable velocity, the squirrel-cage winding 30 is indicated as being a low-resistance winding, which can be accomplished by having low-resistance end-connections 32.

Any suitable controllable energizing-means may be utilized for supplying 3-phase electrical energy to the primary winding 25 of the developed induction-motor, or to the third-rails 26 of Fig. 3.

An exemplary form of electrical energizing and control-equipment is shown in Fig. 5, wherein a 5-point controller-switch 34 is shown, merely by way of example, having an off-position and four operating-positions S1, S2, S3, and S4. The first operative-position S1 is utilized to energize a ready-signal 35. The second operative position S2 is utilized for take-off. It energizes an 80-cycle forward-contactor 80F which picks up and closes three main contacts 36, which energize the 3-phase primary-winding supply-bus 37 of the motor, in the forward phase-sequence, from a 3-phase 80-cycle, 450-volt supply-bus 38, which is intended to be representative of any suitable 3-phase source of electrical energy, of any frequency and voltage, a particular frequency and voltage being indicated only by way of speaking of something specific in the illustrative embodiment of my invention. The motor-bus 37 would be connected, in the form of my invention shown in Figs. 3 and 4, to the track-rails 16 and the third-rails 26, for the purpose of supplying 3-phase electrical power to the 3-phase primary winding 25 on the towing-car 7. This causes the towing-car to move, pulling the aircraft which is to be launched.

When the aircraft 2 of Fig. 1 reaches the point B of the runway, which is the latest point from which it would be possible to bring the towing-car 7 to a stop, the towing-car closes a track-switch TS—400, shown in Fig. 5, which is utilized to energize an auxiliary relay TS' in the power-plant or controlling-station. The auxiliary relay TS' has a make-contact 39 and a break-contact 40. The break-contact 40 deenergizes the 80-cycle forward-contactor 80F, and causes it to close an auxiliary back-contact 42 with which it is provided. As soon as the forward contactor 80F drops out, deenergizing the motor-bus 37, it closes its back-contact 42, which is connected in series with the second controller-switch point S2, to energize an 80-cycle reverse-switch or contactor 80R, the operating coil of which is also connected in series with the make-contact 39 of the auxiliary track-switch relay TS'. The reverse-contactor 80R has three main contacts 43 which energize the motor-bus 37 in the reverse phase-sequence from the 80-cycle supply-bus 38, thus causing the field of the primary-winding to move or progress in the backward direction, strongly braking the towing-car 7, tending to cause it to reverse its direction of movement.

While I have illustrated the track-switch TS—400 as being at about the junction point between the intermediate portion 5 of the track, with its low-resistance squirrel-cage winding 30—32, and the terminal portion 6 of the track, having the high-resistance squirrel-cage winding 30—31, it is not necessary for the track-switch TS—400 to be located at this exact place, as the developed induction motor will stand being plugged, or energized in the reverse phase-sequence while it is in motion, even on the low-resistance part of the secondary member. In general, there will be several track-switches distributed at different points along the track, one of which is illustrated in Fig. 5 at TS—350, representing a switch at the 350-foot point in the track. Before the plane takes off, its weight is known, and the wind-velocity and direction are known, so that a desirable point of actual take-off can readily be precalculated, and selected by the closure of the proper selector-switch, such as the selector-switch SS—350 for the track-switch TS—350 in Fig. 5. In this manner, the auxiliary track-switch relay TS' can be energized at, say, the 350-foot point, by means of the track-switch TS—350.

As soon as the energization of the towing-car 7 is reversed, the car begins to decelerate very rapidly, while the airplane 2 moves on ahead, unhooking itself from the tow-rope at the connection-hook 9, and the plane leaves the ground and is launched. When the towing-car comes to a stop, or nearly comes to a stop, or actually reverses in direction, the operator at the power-plant or control-station on the ground advances the controller-switch 34 to the third operative notch S3 for a slow return of the car 7, back to its starting-point, ready for another take-off. When the controller 34 leaves the second operative contact S2, it deenergizes the 80-cycle reverse-switch 80R, and it subsequently energizes the contact-segment S3 which, in turn, energizes a 16-cycle reverse-switch or contactor 16R. The 80-cycle reverse-switch 80R is shown as being provided with two back-contacts 44 and 45, one in series with the operating-coil of the 80-cycle forward-contactor 80F, and the other in series with the operating coil of the 16-cycle reverse-contactor 16R, so that neither one of these last-mentioned contactors can be energized until, or except when, the 80-cycle reverse-contactor 80R is in its fully deenergized position.

The 16-cycle reverse-switch or contactor 16R is provided with three main contacts 46, which pick up and energize the motor-bus 37 from a 3-phase 16-cycle 40-volt bus 47, which is intended to be symbolic of any suitable 3-phase source of a frequency appropriately lower than the frequency of the first-mentioned supply-bus 38, and usually at a much lower voltage, because very little energy is required in order to return the car 7 to its starting-point, and there is no need to race the car back at a high speed. I intend my electric switch or contactor 16R, therefore, as being symbolic of any suitable means for reducing the frequency and the voltage of the motor-bus 37, for bringing the car back to its starting-point.

When the towing-car approaches its starting-point, on its return-trip, the station-operator advances the controller 34 to the fourth operating point S4, for a reverse-stop. When the controller-switch leaves the third switch-point S3, it deenergizes the 16-cycle reverse-phase-sequence contactor 16R; and when the controller-switch 34 energizes the contact-segment S4, it energizes a 16-cycle forward-phase-sequence contactor 16F through an auxiliary back-contact 48 on the 16-cycle reverse-switch 16R, to make sure that the latter switch is in its deenergized position before the 16F switch is energized. The 16-cycle forward-switch 16F is provided with three main contacts 49, which energize the motor-bus 37 in the forward phase-sequence from the low-frequency supply-bus 47, thus causing the flux-progression to be in the forward or take-off direction, thus braking the car. When the car comes to a stop, the operator moves the controller 34 to the off position, deenergizing the motor-bus 37.

The controller 34, and the associated track-switch elements TS', SS—350, TS—350 and TS—400, cooperate with the forward end reverse contactors or power-switches 80F, 80R, 16F and 16R, to constitute relatively stationarily located control-means, by which I mean that the control-means is stationary or non-movable with respect to the towing-car while the towing-car is moving, without intending to imply that the control-means may not be portable or movable independently of the towing-car.

In Fig. 6, I show an alternative form of embodiment of my invention, in which the primary member 17' is on the ground, and the secondary member 18' is carried by the towing-car 7'. In this case, the towing-car can usually be built somewhat lower and somewhat lighter than when it carries the primary winding. The car-borne secondary winding 30' is a low-resistance squirrel-cage winding, and the car-borne secondary core 28' is preferably extended into the boarding-ramp 21 at each end of the car 7', as shown in Fig. 6.

In Fig. 6, with the primary winding 25' carried in a covered ditch 22' in the runway, it is desirable for the first and last portions 4 and 6 of the runway to have a primary winding which has a short pole-pitch, so that the advancing flux of the 3-phase winding advances relatively slowly, whereas the intermediate portion 5 of the trackway has a long-pitch 3-phase primary winding, which causes the primary flux to advance relatively rapidly.

In Fig. 7, I have diagrammatically indicated special sectionalized energizing-connections for energizing only those portions of the stationary primary winding of Fig. 6 which underlie the car 7', or which fringe on the portion of the primary winding which underlies the car. Any suitable control-means may be utilized for bringing about this sectional energization of the stationary primary winding 25' in Fig. 6.

In Fig. 7, one exemplary embodiment of sectionalized energization utilizes a succession of 3-pole contactor-switches C1, C2, etc., for energizing successive 3-phase poles P1, P2, etc., of the stationary primary winding 25', from the motor-bus 37 of Fig. 5. The front end of the towing-car 7' is illustrated, in Fig. 7, as having a third-rail contact-making shoe 51 which, as the car moves, makes an electrical connection between a positive control-bus or underground rail 52 to successive underground or third-rail track-segments S10, S11, etc., corresponding to the primary-winding poles P10, P11, etc.

Assuming that the car 7' overlies about ten poles of the stationary winding 25', it is desirable that each of the track-segments S10, S11, and the like, when energized, shall effect the energization of ten primary-winding poles. To this end, I have shown, for purposes of illustration, a series of separate relays R10, R11, etc., associated with the successive track-segments S10, S11, etc., to be energized by the respective track-segments. Each of the relays R10, R11, etc., is provided with a series of ten contacts 53 which energize the last preceding ten poles of the poles P1, P2, etc., of the stationary winding 25'.

The third-rail contact-shoe which is borne along by the car 7' may be wide enough so that it never spans more than two track-segments S10, S11, etc., at one time, or it may be wide enough to span three or more segments at some points. Thus, if two adjacent segments, S10 and S11, are spanned at the same time, eleven poles of the primary winding 25' will be energized, the relay R10 energizing poles 1 to 10 and the relay R11 energizing poles 2 to 11. At progressive points along the track, as the speed of the car may be assumed to be materially increased, the track-segments S10, S11, etc., may be positioned more and more in advance of their corresponding primary-winding poles P1, P2, etc., so as to allow for the necessary switching-time in getting the new primary poles energized before the front end of the car over-rides the same. Either the same or a separate set of sectionalizing switches may be provided for the return-movement of the car.

In both forms of embodiment of my invention, the towing-car 7 or 7' pulls the plane along by means of a detachable towing-rope connection which not only steers the plane during the catapulting or acceleration thereof, but also holds down the tail end of the plane with respect to the runway, as long as a material towing-force is exerted by the towing-connection.

In both forms of embodiment of my invention, the towing-car is a low flat car which runs along the surface of the runway, and which is out of any substantial weight-supporting contact with the plane which is being towed. By this, I mean that the large weight-carrying wheels of the landing-gear, which are the front wheels 12 on the plane shown in Fig. 2, which support the main portion of the weight of the plane, do not rest upon the towing-car, and cannot come into contact with the towing-car under any operating conditions, because the car is so low that the plane can overrun the car, without having either one of its main weight-supporting wheels 12 strike the car.

In order that the towing-line 8 may be inclined at a proper angle, so that the connecting-hook 9 on the undercarriage of the plane may be in advance of the center of gravity of the plane, and so that the line of action of the towing rope 8 may be underneath the center of gravity of the plane, it is, I believe, universally necessary for the towing-car 7 or 7' to be either wholly or partially underneath the plane during the towing-operation, in addition to being movable to a relative position further back under the plane at the instant of actual takeoff, when the towing-car is very powerfully decelerated, while the plane continues to move forward at its attained velocity.

In building the tow-car, it is essential to make it as light in weight as possible, so that an excessively large portion of its propelling force will not be used up in overcoming the inertia of its own mass. It is not necessary to have a heavy towing-car for the purpose of developing tractive effort, or cohesion between wheels and rails, nor is it necessary to have a heavy car to resist the vertical component of the pull of the towing-rope, as the magnetic attraction between the primary and secondary members takes care of that. My invention is particularly designed for, and adapted to be used in, a catapult-system where the required takeoff speed is at least 70 miles per hour, and where, to develop that speed at a reasonable acceleration, the towing-car must develop a material amount of aircraft-accelerating force, averaging at least 5,000 pounds, over and above the force necessary to accelerate the mass of the towing-car. The towing-cars which I have illustrated are capable of attaining a speed of 90 miles an hour, and of developing an average accelerating force of several times 5,000 pounds.

While I have described the general principles of my invention, and have illustrated it in a form or forms which at present appear to be preferable, I desire it to be understood that the invention, particularly in its broader aspects, is susceptible of embodiment in many different forms. I desire, therefore, that the appended claims shall be accorded the broadest construction consistent with their language.

I claim as my invention:

1. An electrically controlled system, comprising a reversible self-propelling polyphase-motored movable body, power-feeder means for feeding polyphase electrical energy to said polyphase-motored movable body, a relatively stationarily located power-switch means for controlling the polyphase energy-supply to the polyphase-motored movable body in either sequence of phases, control-means, associated with said power-switch means, for initiating and terminating a forward-driving polyphase energization of said polyphase-motored movable body for a forward run in a selected phase-sequence, and control-means, associated with said power-switch means and responsive to the termination of said forward-run energization, for automatically and promptly thereafter initiating a reverse-phase-sequence energization of the polyphase-motored movable body.

2. An electrically controlled system, comprising a reversible self-propelling polyphase-motored movable body, a track therefor, power-feeder means for feeding polyphase electrical energy to said polyphase-motored movable body, a relatively stationarily located power-switch means for controlling the polyphase energy-supply to the polyphase-motored movable body in either sequence of phases, control-means, associated with said power-switch means, for initiating a forward-driving polyphase energization of said polyphase-motored movable body for a forward run in a selected phase-sequence, track-switch means, associated with said power-switch means and responsive to a predetermined position of said polyphase-motored movable body on said track, for terminating said forward-driving polyphase energization, and control-means, associated with said power-switch means and responsive to said termination of the forward-driving polyphase energization, for automatically and promptly thereafter initiating a reverse-phase-sequence energization of the polyphase-motored movable body.

3. An electrically controlled system, comprising a reversible self-propelling polyphase-motored movable body, a track therefor, power-feeder means for feeding polyphase electrical energy to said polyphase-motored movable body, a relatively stationarily located power-switch means for controlling the polyphase energy-supply to the polyphase-motored movable body in either the sequence of phases, control-means, associated with said power-switch means, for initiating a forward-driving polyphase energization of said polyphase-motored movable body for a forward run in a selected phase-sequence, a plurality of position-responsive means for responding to a plurality of different positions of said polyphase-motored movable body on said track, control-means, associated with said power-switch means and responsive to a selected one of said position-responsive means, for terminating said forward-driving polyphase energization, and control-means, associated with said power-switch means and responsive to said termination of the forward-driving polyphase energization, for automatically and promptly thereafter initiating a reverse-phase-sequence energization of the polyphase-motored movable body.

4. An electrically controlled system, comprising a reversible self-propelling polyphase-motored movable body, power-feeder means for feeding polyphase electrical energy to said polyphase-motored movable body, a relatively stationarily located power-switch means for controlling the polyphase energy-supply to the polyphase-motored movable body in either sequence of phases, control-means, associated with said power-switch means, for initiating and terminating a forward-driving polyphase energization of said polyphase-motored movable body for a forward run in a selected phase-sequence, and control-means, associated with said power-switch means and responsive to the termination of said forward-run energization, for automatically and promptly thereafter electrically energizing the polyphase-motored movable body to stop its motion.

5. An electrically controlled system, comprising a reversible self-propelling polyphase-motored movable body, a track therefor, power-feeder means for feeding polyphase electrical energy to said polyphase-motored movable body, a relatively stationarily located power-switch means for controlling the polyphase energy-supply to the polyphase-motored movable body in either sequence of phases, control-means, associated with said power-switch means, for initiating a forward-driving polyphase energization of said polyphase-motored movable body for a forward run in a selected phase-sequence, track-switch means, associated with said power-switch means and responsive to a predetermined position of said polyphase-motored movable body on said track, for terminating said forward-driving polyphase energization, and control-means, associated with said power-switch means and responsive to said termination of the forward-driving polyphase energization, for automatically and promptly thereafter electrically energizing the polyphase-motored movable body to stop its motion.

6. An electrically controlled system, comprising a reversible self-propelling polyphase-motored movable body, a track therefor, power-feeder means for feeding polyphase electrical energy to said polyphase-motored movable body, a relatively stationarily located power-switch means for controlling the polyphase energy-supply to the polyphase-motored movable body in either sequence of phases, control-means, associated with said power-switch means, for initiating a forward-driving polyphase energization of said polyphase-motored movable body for a forward run in a selected phase-sequence, a plurality of position-responsive means for responding to a plurality of different positions of said polyphase-motored movable body on said track, control-means, associated with said power-switch means and responsive to a selected one of said position-responsive means, for terminating said forward-driving polyphase energization, and control-means, associated with said power-switch means and responsive to said termination of the forward-driving polyphase energization, for automatically and promptly thereafter electrically energizing the polyphase-motored movable body to stop its motion.

7. An electrically controlled linear-motor system, comprising a flat primary member and a flat secondary member wtih an airgap in between, said secondary member being a stationary member and said primary member being a movable member moving with respect to said stationary member, said movable primary member comprising a laminated magnetizable core having a polyphase primary winding thereon close to the airgap, and said stationary secondary member comprising a laminated magnetizable core having a squirrel-cage secondary winding thereon in operative relation to the airgap, the secondary winding on the first and last parts of the stationary secondary member having a high resistance, and the secondary winding on an intermediate part of the stationary secondary member having a low resistance, a polyphase supply-bus including third-conductor means extending continuously throughout substantially the entire length of said secondary member, and current-collector means carried by the towing-car in operative cooperation with said third-conductor means, for supplying polyphase electrical energy to said polyphase primary winding at all times when it is energized, the phase-sequence of the primary winding always being the same as the phase-sequence of the supply-bus, polyphase energy-supplying means for energizing said polyphase supply-bus, and forward phase-sequence and reverse phase-sequence switch-means interposed between said polyphase energy-supplying means and said polyphase supply-bus.

8. The invention as defined in claim 7, in combination with means responsive to any one of a plurality of positions of the movable primary member along the length of the secondary member for opening said forward phase-sequence switch-means and closing said reverse phase-sequence switch-means, and preselective control-means whereby a particular one of said positions may be preselected before the starting of said linear motor.

FRANK B. POWERS.